(12) United States Patent
Szatmary et al.

(10) Patent No.: US 11,924,483 B2
(45) Date of Patent: *Mar. 5, 2024

(54) METHOD FOR ON-DEMAND VIDEO EDITING AT TRANSCODE- TIME IN A VIDEO STREAMING SYSTEM

(71) Applicant: Mux, Inc., San Francisco, CA (US)

(72) Inventors: Matthew Szatmary, Walnut Creek, CA (US); Adam Brown, Oakland, CA (US); Jon Dahl, San Francisco, CA (US); Matthew Ward, South Lake Tahoe, CA (US); Nicholas Chadwick, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/714,115

(22) Filed: Apr. 5, 2022

(65) Prior Publication Data

US 2022/0232267 A1    Jul. 21, 2022

Related U.S. Application Data

(63) Continuation of application No. 17/031,536, filed on Sep. 24, 2020, now Pat. No. 11,570,490.
(Continued)

(51) Int. Cl.
*H04N 21/2343* (2011.01)
*G11B 27/031* (2006.01)
(Continued)

(52) U.S. Cl.
CPC ... *H04N 21/234309* (2013.01); *G11B 27/031* (2013.01); *H04N 21/231* (2013.01);
(Continued)

(58) Field of Classification Search
CPC .......... H04N 21/23409; H04N 21/231; H04N 21/2353; H04N 21/2393; H04N 21/8358; H04N 21/8586; G11B 27/03
See application file for complete search history.

(56) References Cited

U.S. PATENT DOCUMENTS 9,549,152 B1 * 1/2017 Nayyar ................. H04L 65/403
2017/0083430 A1 * 3/2017 Meerovich ............... G06F 8/00
(Continued)

*Primary Examiner* — Jefferey F Harold
*Assistant Examiner* — Alexander Boyd
(74) *Attorney, Agent, or Firm* — Run8 Patent Group, LLC; Peter Miller; Danielle D. Michaud

(57) ABSTRACT

A method includes: receiving a script configured to modify the audio-video file; calculating a performance metric based on execution of the script on a set of test files; classifying the script as performant based on the performance metric; defining a metadata store associated with the script and the audio-video file; receiving a playback request specifying a rendition of the audio-video file from a computational device; in response to receiving the playback request: accessing a set of data inputs from the metadata store; executing the script on a frame of the audio-video file based on the set of data inputs to generate a modified frame of the audio-video file; transcoding the modified frame of the audio-video file into the rendition to generate an output frame of the audio-video file; and transmitting the output frame of the audio-video file to the computational device for playback at the computational device.

19 Claims, 9 Drawing Sheets

Related U.S. Application Data

(60) Provisional application No. 62/905,230, filed on Sep. 24, 2019.

(51) Int. Cl.
  *H04N 21/231* (2011.01)
  *H04N 21/235* (2011.01)
  *H04N 21/239* (2011.01)
  *H04N 21/8358* (2011.01)
  *H04N 21/858* (2011.01)

(52) U.S. Cl.
  CPC ..... *H04N 21/2353* (2013.01); *H04N 21/2393* (2013.01); *H04N 21/8358* (2013.01); *H04N 21/8586* (2013.01)

(56) References Cited

U.S. PATENT DOCUMENTS

2018/0034880 A1* 2/2018 Choi ................... H04L 65/765
2019/0090001 A1* 3/2019 Smith ............... H04N 21/8456

* cited by examiner

METHOD FOR ON-DEMAND VIDEO EDITING AT TRANSCODE- TIME IN A VIDEO STREAMING SYSTEM

CROSS-REFERENCE TO RELATED APPLICATIONS

This Application is a continuation of Ser. No. 17/031,536, filed on 24 Sep. 2020, which claims priority to U.S. Provisional Application No. 62/905,230, filed on 24 Sep. 2019, which is incorporated in its entirety by this reference.

This Application is related to U.S. patent application Ser. No. 16/458,630, filed on 1 Jul. 2019, which is incorporated in its entirety by this reference.

TECHNICAL FIELD

This invention relates generally to the field of audio and video editing and more specifically to a new and useful method for on-demand video editing at transcode-time in a video streaming system in the field of audio and video editing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
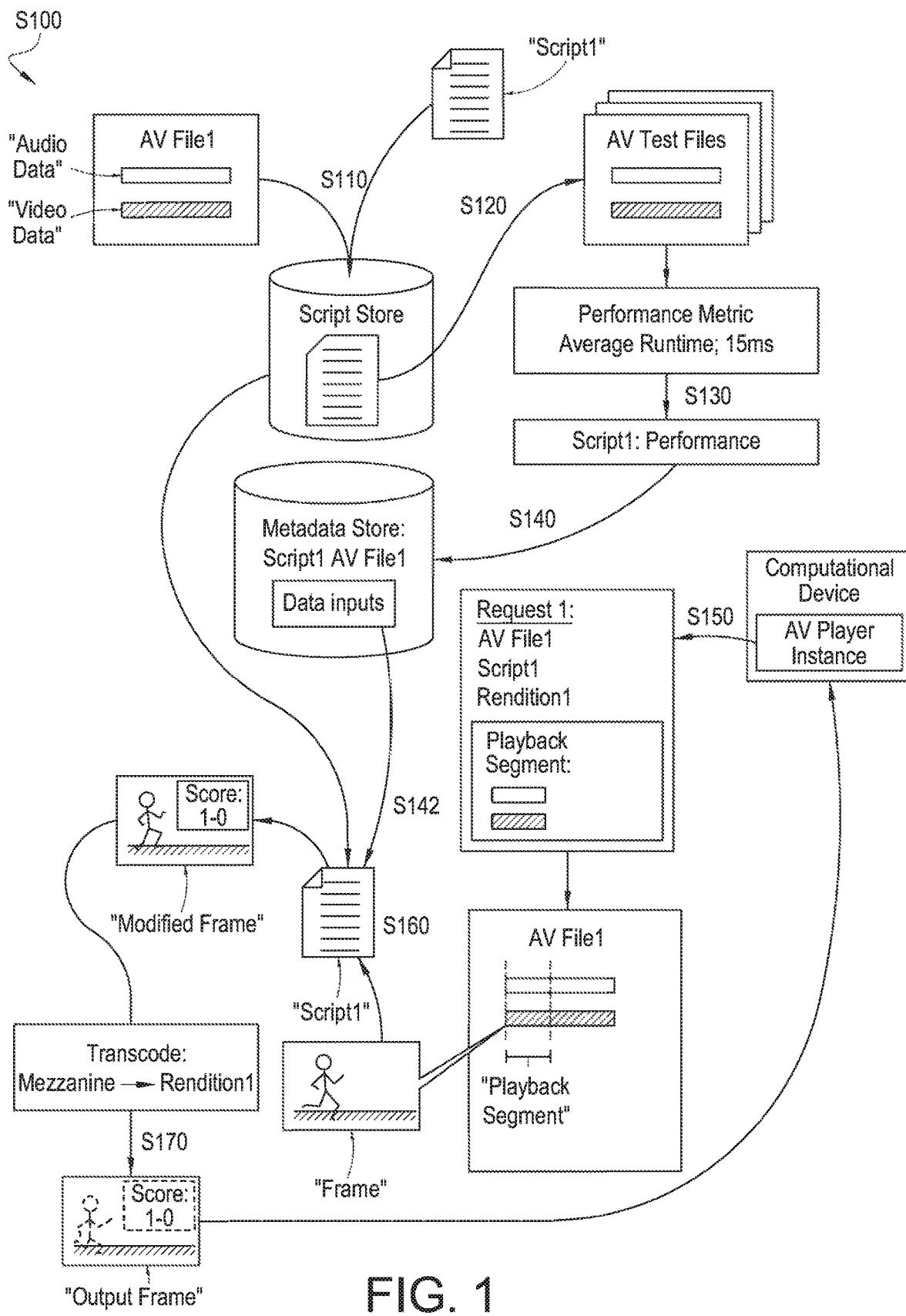
FIG. 1 is a flowchart representation of a method.

As shown in FIG. 1, a method for transcode-time video editing includes: receiving a first script associated with a first audio-video file and configured to modify the first audio-video file in Block S110; calculating a first value of a performance metric based on execution of the first script on a set of test files in Block S120; classifying the first script as performant based on the first value of the performance metric in Block S130; defining a metadata store associated with the first script and the first audio-video file and configured to comprise a set of data inputs in Block S140; and receiving a first playback request for the first audio-video file from a first computational device, the first playback request specifying a first rendition of the first audio-video file in Block S150. The method S100 also includes, in response to classifying the first script as performant and in response to receiving the first playback request: accessing the set of data inputs from the metadata store in Block S142; executing the first script on a frame of the first audio-video file based on the set of data inputs to generate a first modified frame of the first audio-video file in Block S160; transcoding the first modified frame of the first audio-video file into the first rendition to generate a first output frame of the first audio-video file in Block S170; and transmitting the first output frame of the first audio-video file to the first computational device for playback at the first computational device in Block S180.

2. Applications

Generally, an audio-video streaming system (hereinafter "the system"), which can include a server and/or a computer network, can execute Blocks of the method S100 to: ingest a video editing script in association with an audio-video file (hereinafter "AV file") or a live audio-video stream (hereinafter "livestream"); evaluate the ingested script to determine whether the script can be executed just-in-time, during transcode of the audio-video file (i.e. at "transcode-time"); and, in response classifying the script as a transcode-time eligible (i.e., performant) script (i.e., a "transcode-time script"), execute the script at transcode-time when serving a request for a rendition of the AV file in accordance with an internet streaming protocol (e.g., HLS streaming). Therefore, by executing Blocks of the method S100, the system enables users to edit or modify an AV file that has already been uploaded to the system for streaming by simply submitting a new or updated transcode-time script associated with the AV file, as opposed to editing a local copy of the AV file and reuploading the AV file to the system. In a livestreaming application, the system can receive an updated script associated with the livestream and modify graphics, filters, audio, or any other aspect of the livestream at the server side upon receipt and evaluation of the newly submitted script.

Thus, the system provides users with server-side resources to edit and manipulate AV files before, during, or after the AV file is streamed to viewers of the AV file. Additionally, by modifying the AV file at transcode time, the system integrates updated visual and audio content of the AV file into a stream-able encoding of the AV file, as opposed to simply overlaying graphics and/or audio onto a separately transcoded AV file. Thus, the system reduces the bandwidth occupied by the addition of visual or audio effects to the AV file and hampers extraction of the original AV file from the modified AV file, thereby improving the efficacy of watermarks or other security-related effects added to an AV file.

In addition to ingesting, evaluating, and executing transcode-time scripts on AV files and/or livestreams prior to streaming, the system can provide a scripting environment for transcode-time video editing and an API exposing various data elements of the AV file for manipulation by a transcode-time script, such as a video frame buffer, an audio frame buffer, raw pixel data of each frame in the video frame buffer, raw audio data for each frame in the audio frame buffer, the time of the AV file, total duration of the AV file, native resolution of the AV file, or any other data or metadata pertaining to the AV file. The system can support any common scripting language, such as JAVASCRIPT (e.g., utilizing the CHROME V8 Engine), LUA, and PYTHON and can support corresponding APIs and/or libraries specific to video, audio, and image editing, such as FFMPEG (for filters), HTML CANVAS (for graphics), or any other API or library. However, in addition to the languages, APIs, and libraries listed above, the system can support any interpreted or compiled language and any API or library compatible therewith. Furthermore, the system can expose APIs with optimized and/or built-in functions specific to transcode-time AV editing in order to improve a user's scripting experience within the scripting environment.

In order to execute video, audio, or image editing scripts on-demand and at transcode-time, the system leverages just-in-time transcoding technology described in related U.S. patent application Ser. No. 16/458,630, which is incorporated in its entirety by this reference. Therefore, the system can execute just-in-time transcoding to accumulate a full set of transcoded rendition segments for an AV file, wherein each rendition segment is transcoded in (near) real-time following a first request for this rendition segment from an AV player instance after—rather than before—the AV file is published for streaming. Thus, the computer system can greatly reduce the time-to-publication of an AV file. Additionally, the computer system can reduce the immediate computational requirements for transcoding an AV file into a number of advertised renditions in a short period of time (i.e. before publishing the stream of the AV file) and can instead spread this computational load over a longer period of time. Furthermore, by transcoding rendition segments of the AV file on-demand, the computer system can conserve storage space for the time period before each rendition segment is requested for the first time. Therefore, the system executes Blocks of the method S100 before, during, and/or after executing steps of the just-in-time transcoding process. As a result, the system can execute a transcode-time script associated with an AV file when that AV file is requested for streaming, thereby conserving computational editing resources if the AV file is not requested for viewing. For example, if the system ingests an AV file and an associated transcode-time script configured to render a graphical overlay in the AV file, the system can execute this transcode-time script upon receiving a request to stream a particular segment and can render the graphical overlay for the segment that is streamed to a viewer. Therefore, if other segments of the AV file are never requested, the system saves the computational time that would have been required to render the graphical overlay in those segments.

The system can ingest a transcode-time script alone (e.g., in association with a previously ingested AV file) or paired with an associated AV file. Upon ingesting a script, the system can perform a set of tests to evaluate the performance characteristics of the transcode-time script (e.g., according to a performance metric). Therefore, the system can execute the transcode-time script on a series of test AV files to identify whether the script exceeds any of a set of runtime thresholds, whether the transcode-time script modifies audio data, video data, or both types of data, and/or the ideal hardware for executing the transcode-time script (e.g., a server equipped with a GPU). Once the system has evaluated the transcode-time script, the system can classify the transcode-time script as either a performant (i.e., approved for execution at transcode-time) or a non-performant script (i.e., an ingest-time script, a script to be executed at ingest time). If the system classifies a transcode-time script as non-performant, then the system can execute the script at ingest time on the mezzanine version of the AV file. Alternatively, if the system classifies the transcode-time script as performant script, the system can store the script for execution at transcode-time.

In one implementation, the system can define a metadata store associated with a transcode-time script to store metadata to be utilized by the transcode-time script. The system can also receive metadata scripts, which the system can execute in order to push data inputs to the transcode-time script to the metadata store associated with the transcode time script. For example, the system can periodically (e.g., every minute) execute a metadata script to push (i.e. store) a current stock price to the metadata store. Therefore, upon receiving a playback request for the AV file, the system can access the current stock price, and render an overlay image in the AV file prior to transcoding the AV file into the requested rendition. The system can, therefore, define an API to append, access, and/or format data in a metadata store associated with a transcode-time script in order to enable a user to view or modify the content of the metadata store (and therefore any related functionality of the transcode-time script). Alternatively, the system can receive and execute an ingest-time metadata script, to generate data inputs for a transcode-time script by extracting these data inputs in a first pass of the AV file at ingest time. For example, the system can execute a computationally expensive ingest-time metadata script that identifies the pixel location and/or orientation of faces detected in each frame of the AV file and stores these pixel locations and/or orientations in the metadata store associated with a corresponding transcode-time script. Therefore, when the system executes the transcode-time script on the AV file at transcode time, the system can access the stored pixel locations and/or orientations in order to modify the AV file based on the locations and/or orientations of faces within the AV file, a process that may otherwise be prohibitively computationally expensive to execute at transcode-time.

In another implementation, the system can execute a data collection transcode-time script in order to record data based on the contents of an AV file. For example, the system can execute a script that classifies objects within a livestream and saves a classification vector to the metadata store, such that a user can later analyze these vectors to determine the content of the livestream. Thus, the system can enable data collection (e.g., for a livestream) in the metadata store.

Once the system classifies the script as a performant transcode-time script and defines a metadata store for the script, the system can, in response to receiving a request to view the AV file associated with the script, execute the transcode-time script on the mezzanine version of the AV file, transcode the modified AV file to a requested rendition, and serve (e.g., transmit or stream) the modified and transcoded video to a viewer or other requesting entity such as content delivery network (hereinafter "CDN"). Thus, the system provides flexible, server-side video and audio editing capabilities to users while minimizing increases in latency and computational load associated therewith.

3. Terms

Generally, the term "stream," as used herein, refers to a bitstream of encoded audio, video, or any other data between two devices or computational entities executing on devices (e.g., AV players executing on a mobile computing devices) such as an HLS, HDS, or MPEG-DASH stream. Therefore, the system can initiate streams between servers in the system, between the system and a content delivery network (hereinafter "a CDN"), or between the system and any other computational device.

Generally, the term "segment," as used herein, refers to a series of encoded audio and/or encoded video data corresponding to a particular time interval or consecutive series of frames in an AV file or AV stream.

Generally, the term "mezzanine," as used herein, refers to the highest quality (e.g., high bitrate and high resolution)

encoding (i.e. a bitrate resolution pair) of an AV file cached by the system that derives from the original version of the AV file uploaded to the system. Therefore, a "mezzanine segment" refers to a segment of an AV file encoded at the highest quality encoding for the AV file.

Generally, the term "rendition" refers to any encoding of an AV file that is indicated in the rendition manifest or manifest file (e.g., an HLS manifest) associated with a stream of the AV file. Therefore, a "rendition segment" refers to a segment of the AV file that has been transcoded at a bitrate and/or resolution different from the mezzanine segment. The system can transcode any mezzanine segment into multiple corresponding rendition segments in various renditions representing the same time interval in the AV file at differing bitrates and resolutions.

Generally, the term "playback segment" refers to a segment requested by a CDN or directly from an AV player specifying a time interval in the AV file and a rendition of the AV file to be served by the system. Therefore, a playback segment coincides or is coincident with a mezzanine segment or rendition segment if a time interval defined by the playback segment temporally overlaps with the mezzanine segment or rendition segment in the AV file respectively. Additionally or alternatively, the AV player or CDN can request a playback segment by specifying an index (e.g., a segment number) of a total number of playback segments in the AV file (e.g., based on a playback segment duration). Therefore, the system can calculate a playback interval by in the AV file based on the index of the requested playback segment and a known (or specified) playback segment duration (e.g., 5 seconds).

Generally, the term "transcode-time script" refers to a script (e.g., a set of computer instructions) received by the system for execution at transcode time. However, the system can classify a transcode-time script as non-performant and instead execute the transcode-time script at ingest time or opt not to execute the transcode-time script at all.

Generally, the term "ingest-time script" refers to a script received by the system for execution at ingest time or shortly after an associated AV file is uploaded to the system. Thus, the system can execute an ingest-time script on an AV file independent of receiving a playback request for an associated AV file.

Generally, the term "metadata script" refers to a script received by the system to update or otherwise modify data inputs to a transcode-time script within a metadata store associated with the transcode-time script. Thus, the system can execute a metadata script to maintain an updated set of data inputs in the metadata store and thereby incorporate this set of data inputs into the AV file at transcode time according to an associated transcode-time script.

Generally, the term "performant" indicates that the system has designated that a transcode-time script can be executed at transcode-time without noticeably affecting stream latency and/or stream quality of an associated AV file.

Generally, the term "non-performant" indicates that the system has designated that a transcode-time cannot be executed at transcode time without noticeably affecting stream latency and/or stream quality of an associated AV file.

Generally, the system can execute a script "on" an AV file to modify or extract data from: individual or multiple video frames, individual or multiple audio frames, audio and/or video header data, or any other data within an AV file.

Generally, the system can interface directly with an AV player instance on a local computing device. Alternatively, the system can serve a stream of the AV file to a content delivery network (hereinafter "CDN"), which can relay the stream of the AV file to the AV player instance. For ease of explanation, any discussion herein of requests by an AV player instance are also applicable to requests by CDNs.

4. Scripting Environment

The system can host a scripting environment in the form of an application configured to interface with the system and improve user experience when writing scripts for on-demand video editing. The scripting environment can define a graphical user interface for writing scripts for transcript-time execution according to the method S100. The scripting environment can include features configured to assist users in writing scripts compliant with the method S100.

In one implementation, the scripting environment can support syntax highlighting for audio and/or video frame buffer primitives and supported or built-in functions for common AV file modifications (e.g., color filters, simple graphics). Additionally, the scripting environment can provide debugging features to highlight particular lines of code, such as loops and conditionals, which may cause incompatibilities (e.g., greater than threshold runtimes) during execution of Blocks of the method S100. Furthermore, the scripting environment can prohibit usage of certain networking functionality of each supported scripting language in scripts written in the scripting environment.

However, the system can also ingest scripts written in any standard programming environment.

4.1 Exposed AV Elements

The system can provide an API for interfacing with AV files ingested by the system, which can define primitives for accessing audio and video frame buffers, pixel data for each video frame, audio spectrum data for each audio frame, total AV file duration, current AV file time, AV file resolution, other video compression data for a compressed mezzanine AV files. Additionally, the system can define primitives for accessing data (e.g., appending or dequeuing) from a metadata cache associated with the AV file, which is further described below.

4.2 Scripting Examples

Although the system can execute any script while transcoding an ingested AV file, the following section includes examples illustrative of the capabilities of the system.

In one example, the system can execute a script on an AV file that strips color from each video frame of the AV file such that the video streamed to the user is black and white despite the originally ingested AV file including colored pixels. Thus, the system can execute scripts that selectively change color values of pixels in an AV file. Therefore, a user of the system may apply filters to previously or concurrently ingested AV files post hoc to, for example, designate particular content as outdated content (e.g., via a black and white filter) or to improve the brightness in an AV file following feedback the that AV file is too dark by uploading a script as opposed to an entirely new AV file.

In another example, the system can execute a script on an AV file that renders a graphic within each video frame of the AV file such that the video streamed to the user includes the rendered graphic despite the originally ingested AV file not including the same graphic. Thus, the system can execute scripts that generate graphics, watermarks, or any other additive visual content. Therefore, a user of the system can, for example, apply subtitles, user specific watermarks, or other visuals to previously or concurrently ingested AV files.

In yet another example, the system can execute a script on an AV file that renders a graphic within each video frame of the AV file representing the concurrent audio frame of the AV file (e.g., as a waveform). Thus, the system can execute scripts that interact with both audio and video data of an AV file. Therefore, a user of the system can, for example, modify the volume of the AV file or render visuals based on the audio component of the AV file (e.g., speech detection-based subtitles) on previously or concurrently ingested AV files.

In yet another example, the system can execute a script on an AV file that renders a graphic within each video frame of the AV file representing a stock price (or any other data element stored in a metadata store associated with the AV file) that has been appended to metadata associated with the script and the AV file. Thus, the system can execute scripts that modify the AV file based on metadata stored in a metadata store associated with the AV file. Therefore, a user of the system can update graphics or information presented in a previously or concurrently ingested AV file in real-time.

In yet another example, the system can execute a script on a livestream that performs object recognition on incoming video frames of the livestream and counts the number of cars detected in video frames of the livestream. Thus, the system can execute scripts that analyze frames of an AV file (or livestream) and can store metadata in a metadata store associated with the AV file.

5. AV File and Script Ingest

As shown in FIG. 1, in Block S110, the system can store a transcode-time script associated with an AV file in a script store. More specifically, the system can ingest a new transcode-time script and a new AV file concurrently or in succession. For example, the system can ingest a new transcode-time script in association with a preexisting AV file or can ingest a new AV file in association with a preexisting transcode-time script. Additionally, the system can ingest new scripts (i.e., transcode-time scripts, ingest-time scripts, and/or metadata scripts) associated with a class of AV files. For example, the system can associate a new script with a set of AV files from the same publisher or other entity.

Upon receipt of a new transcode-time script for ingest, the system can: classify the transcode-time script as a performant or non-performant based on a test set of AV files; perform an initial transcode or transmux on the ingested AV file in order to normalize the encoding of the AV file; define a metadata store associated with the combination of the ingested transcode-time script and the associated AV file; execute any ingest-time scripts during initial transcode or transmux of the ingested AV file; store any transcode-time scripts for later execution; and assign a unique URL corresponding to the combination of the ingested transcode-time script and the associated AV file. Additionally, when storing a newly ingested AV file, the system can segment (e.g., at each keyframe of the AV file) and store the AV file in a mezzanine cache.

In addition to ingesting a transcode-time script, the system can also ingest ingest-time scripts, metadata scripts, and/or ingest-time metadata scripts in association with a concurrently received AV file or a preexisting AV file. Upon ingesting an ingest-time script, the system can successively execute the ingest time script on the associated AV file and reencode the mezzanine version of the AV file prior to storing the AV file in a mezzanine cache. Thus, the system can execute computationally expensive scripts prior to transcode time in order to prevent an increase in latency and/or a reduction in quality of the stream of the AV file.

Upon ingesting a metadata script, the system can identify whether the metadata script is designated as an ingest-time metadata script or a periodic metadata script. In response to identifying the metadata script as an ingest-time metadata script the system can execute the script on the associated AV file at ingest-time and store data generated by the ingest-time metadata script to the metadata store associated with the transcode-time script and/or the AV file. In response to identifying the metadata script as a periodic metadata script, the system can store the periodic metadata script and can repeatedly execute the periodic metadata script according to a time interval specified by the periodic metadata script in order to update data inputs stored in the metadata store associated with the transcode-time script and/or the AV file.

5.1 Mezzanine Segments

Generally, the system can ingest a new AV file and segment the AV file into a set of mezzanine segments for subsequent just-in-time transcoding based on the location of keyframes in the AV file, as described in U.S. patent application Ser. No. 16/458,630. More specifically, the system can: normalize the encoding and container format of the AV file; identify keyframes in the AV file; and segment the AV file into a set of mezzanine segments based on the identified keyframes in the AV file. Thus, the system prepares the AV file for just-in-time transcoding and modification via execution of a transcode-time script.

5.2 Transcode-Time Script Classification

Figure 2:
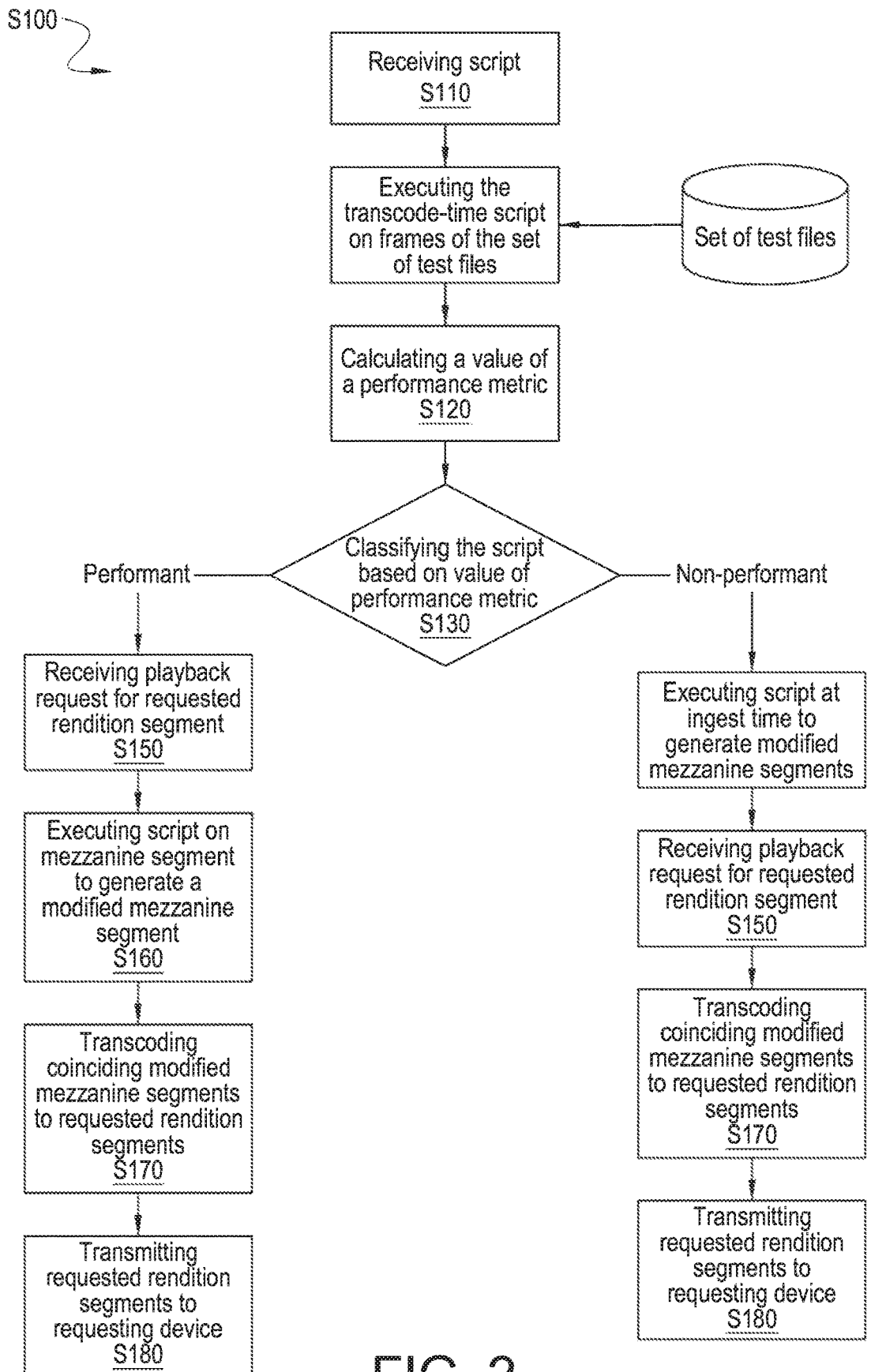
FIG. 2 is a flowchart representation of one variation of the method.

As shown in FIG. 2, the system can calculate a first value of a performance metric based on execution of a transcode-time script on a set of test files, in Block S120, and classify the transcode time script as performant or non-performant, in Block S130, in order to evaluate whether the system can execute the transcode-time script during the transcoding process without substantially increasing latency or bandwidth required to stream the AV file. More specifically, the system can: select and access a set of test files representative of the AV file associated with the transcode-time script; execute the transcode-time script on each test file in the set of test files (or a sampling of frames from each test file in the set of test files); and calculate a performance metric based on the execution of the transcode-time script on the set of test files. Thus, the system can more accurately detect non-performant transcode-time scripts that cannot be executed at transcode-time due to computational or latency concerns.

The system can execute the foregoing Blocks of the method S100 on a standardized test set of AV files in order to evaluate the performance of ingested scripts on a range of possible input AV files. More specifically, the standardized test set of files can include AV files (or still images) spanning a range of visual/audio complexities, durations, framerates, resolutions, bitrates, encoding, container format, or any other characteristic of an AV file. In one implementation, the system can execute the script on a test set of files with the same resolution(s), bitrate(s), encoding, and/or container format that the system can offer for streaming of the AV file associated with the script.

In one implementation, by selecting a set of similar test files, the system can reduce the probability of misclassification of the transcode-time script, thereby improving overall system reliability while still offering substantial flexibility to users in writing fully custom transcode-time scripts. In one implementation, the system can execute a video classification model (e.g., a machine learning model) to characterize the content, visual properties, and/or audio properties of the AV file associated with the transcode-time script by generating a classification vector representing the AV file associated with the transcode-time script. The system can then compare (e.g., by calculating a difference vector) the classification vector characterizing the AV file associated with the transcode time script with a precalculated classification vector characterizing each test file in a set of test files. The system can then select a subset of most similar test files by selecting test files with low difference vectors based on the classification vector characterizing the AV file. Thus, the system can: select a set of similar test files to the first AV file based on the AV file and a video classification model; and calculate the first value of the performance metric based on execution of the first script on the set of similar test files.

Additionally or alternatively, the system can select a set of previous AV files submitted to the system, by the same publisher as the current AV file, as test files for the purpose of classifying the transcode-time script associated with the AV file. Thus, the system can: select a set of similar test files to the AV file based on a prior set of files sharing a publisher with the AV file; and calculating the first value of the performance metric based on execution of the first script on the set of similar test files. Furthermore, the system can execute a combination of the aforementioned test file selection processes and select a subset of similar test files from a set of AV files previously submitted by the publisher of the current AV file.

The system can also define subsets of the set of test files that evaluate specific performance features of the transcode-time script. For example, the system can define a subset of the test set that have a high visual complexity and a subset of the test set that have a high audio complexity.

Additionally or alternatively, the system can generate a custom test set based on an AV file associated with the script. In one implementation, the system can generate a custom test AV file based on a set of frames of the AV file associated with the script. In yet another alternative implementation, the system can provide an interface for the user to define a custom test set of AV files with which the system can evaluate future scripts written by the user.

However, the system can store and/or generate a test set of files in any other way.

Upon executing the transcode-time script on the set of test files, the system can calculate a performance metric in order to classify the transcode-time script. In particular, the system can calculate individual values of a performance metric for each execution of the transcode-time script on a test file and aggregate these values via a summary statistic in order to calculate a value for the performance metric. The system can calculate performance metrics including script runtime, script memory usage, and/or script power consumption and can aggregate these via summary statistics including average, weighted average, median, or mode. Alternatively, the system can generate a performance metric for each test file and classify whether the transcode-time script is performant for each individual test tile. The system can then classify the transcode-time script based on the proportion of "passes" relative to a threshold value indicating a minimum value of the performance metric for each test file.

In one implementation, the system can: execute the transcode-time script on the set of test files to generate a set of runtimes; and, in response to a first threshold runtime exceeding each of the set of runtimes, classify the transcode-time script as a performant transcode-time script. More specifically, the system can execute the transcode-time script on a set of preexisting test files and record one or more runtimes for each test file in the set of test files in order to evaluate the performance of the transcode-time script on a range of AV files.

In another implementation, the system can execute the transcode-time script on test files using different hardware in order to evaluate the performance of the transcode-time script when executed by various hardware available to the system. For example, the system can execute the transcode-time script on a subset of test files at a first machine including a central processing unit (hereinafter "CPU") and also execute the transcode-time script on the same subset of test files at a second machine including a graphics processing unit (hereinafter "GPU"). Therefore, the system can record two runtimes (corresponding to the first and second machine) for one test file.

After recording the set of runtimes, the system can compare the set of runtimes to a set of runtime thresholds in order to classify the transcode-time script as a non-performant transcode-time script (for execution at ingest time) or a performant transcode-time script. In one implementation, the system can classify the transcode-time script as a performant transcode-time script if all of the set of runtime thresholds exceed the corresponding runtimes recorded for the transcode-time script when executed on the set of test files. In another implementation, the system can classify the transcode-time script as a performant transcode-time script if a threshold proportion of runtime thresholds exceed the corresponding runtime for the set of test files. In yet another implementation, the system can classify the transcode-time script as a performant transcode-time script if an average runtime of the set of runtimes is less than a threshold runtime. Additionally or alternatively, the system can calculate a weighted average runtime and classify the transcode-time script as a performant transcode-time script if the weighted average runtime is less than a threshold runtime.

However, the system can execute any other type of statistical classification on the set of performance metric values in order to classify the transcode-time script as a performant transcode-time script or a non-performant transcode-time script.

In one implementation, the system can classify a transcode-time script as performant on specific hardware based on the set of runtimes recorded from executing the transcode-time script on test files at specific hardware available to the system. For example, the system can classify the transcode-time script as a performant transcode-time script when executed on hardware including a GPU and a non-performant transcode-time script when executed on hardware not including a GPU, and, in response, select hardware including a GPU for execution of the transcode-time script on the AV file.

In one implementation, the system can designate a transcode-time script as a non-compliant transcode-time script if the transcode-time script fails to compile or does not return a compliant output within a predetermined time period. If the system does not classify a transcode-time script as a performant transcode-time script and does not designate the transcode-time script as a non-compliant transcode-time script, the system can classify the transcode-time script as a non-performant transcode-time script for execution during ingest-time of the AV file and/or during transcoding of the mezzanine segments of the AV file.

5.3 Transcode-Time Script

Upon classifying a transcode-time script as performant, the system can store the transcode-time script in association with the AV file for later execution by the system during the just-in-time transcoding process. Therefore, the system can conserve computational resources for executing the script on the AV file when the AV file is requested by a player instance or CDN.

5.4 Metadata Store

Upon receiving a transcode-time script or an AV file, the system can define a metadata store associated with the transcode-time script and/or the corresponding AV file. More specifically, the system can define a metadata store associated with the transcode-time script and the AV file and configured to store a set of data inputs in Block S140. Thus, while executing a transcode-time script on the AV file, the system can access a set of data inputs informing the modifications to the AV file performed by the system according to the transcode-time script.

The system can define application programming interfaces (hereinafter "APIs") to interface with the metadata store for inclusion in transcode-time scripts, ingest-time scripts, and metadata scripts. For example, the system can define APIs that enable the creation or update of data variables in a metadata store associated with a given AV file and associated with a given transcode-time script. Additionally or alternatively, the system can define an API that accesses a set of existing data inputs stored in a given metadata store.

In one implementation, the system defines a metadata store that is appended only for a user. Therefore, the user (via a script) can append metadata to the metadata store. The system, when executing a transcode-time script, can then access the most recently appended data for user by the transcode-time script.

Additionally or alternatively, the metadata store can function as a cache for metadata accumulated by a transcode-time script. The system can serve the metadata store to a user for review of the cached metadata.

5.5 Ingest-Time Scripts

During and/or after normalization of an ingested AV file, the system can execute a ingest-time script associated with the AV file (or any non-performant transcode-time scripts associated with the AV file). Therefore, the system can classify a script as a non-performant transcode-time script and instead execute the transcode-time script on the AV file during ingest of the AV file.

Figure 3:
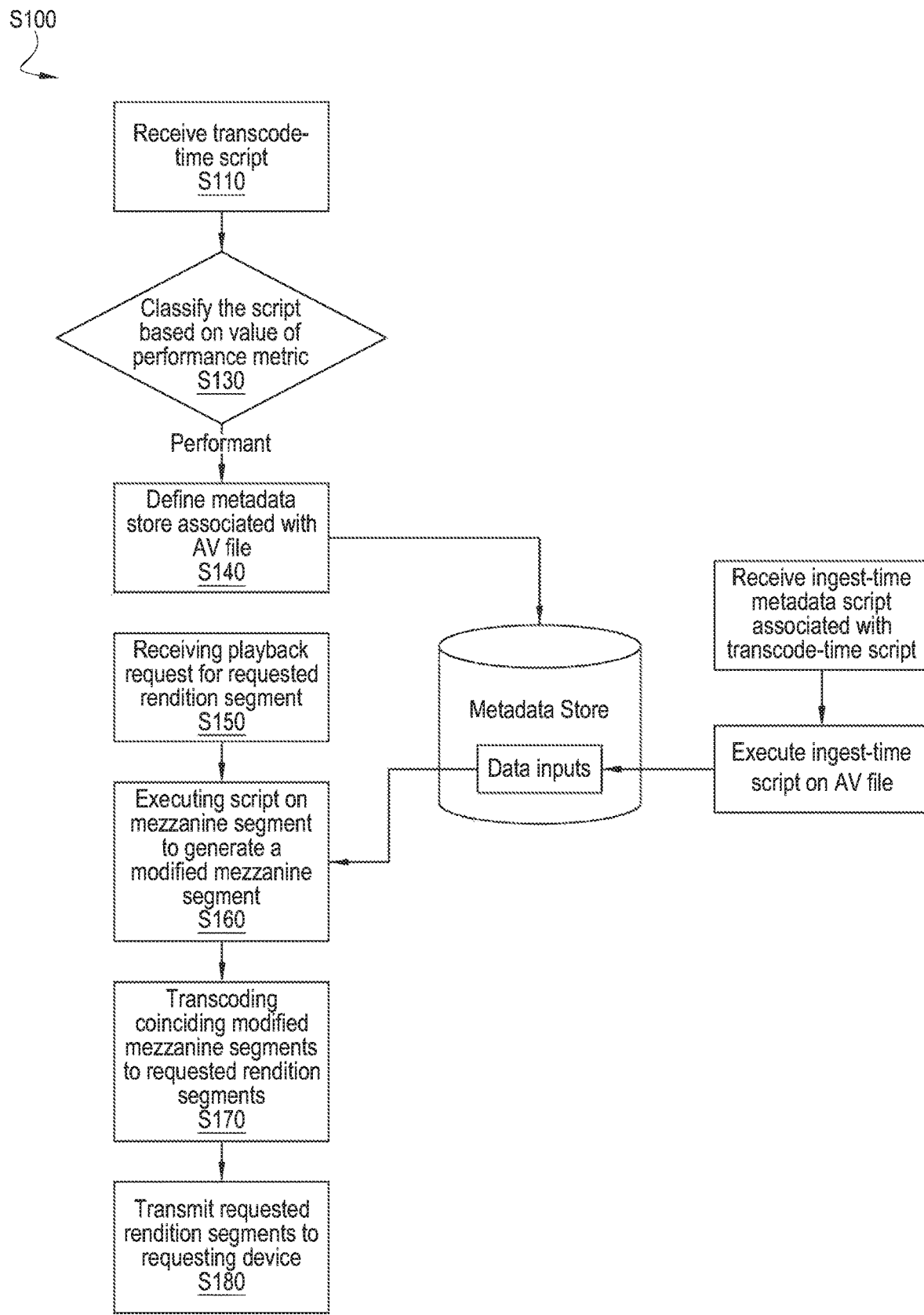
FIG. 3 is a flowchart representation of one variation of the method.

Alternatively, as shown in FIG. 3, the system can receive a script designated by a user as a ingest-time script and can execute the designated ingest-time script during normalization of the AV file independent of any classification of the transcode-time script. The system can therefore provide a user the opportunity to generate metadata to be utilized by a transcode-time script in a metadata store associated with the AV file.

Therefore, the system can: execute ingest-time scripts that generate and store metadata about the AV file; and execute a corresponding transcode-time script that can then access these metadata instead of generating the metadata at transcode-time in order to perform more complex or state dependent functions. More specifically, the system can: receive a transcode-time script associated with an AV file; and receive an ingest-time script associated with the same AV file, associated with the transcode time script, and configured to generate a set of data inputs for the transcode-time script based on the AV file. The system can then, at ingest time of the AV file: execute the ingest-time script on the AV file to generate the set of data inputs for the transcode-time script; and store the set of data inputs in the metadata store associated with the transcode-time script. Thus, at transcode-time, the system can execute the transcode-time script based on the set of data inputs stored in the metadata store.

In one example, the system can execute an ingest-time script to extract pixel locations and orientations of facial features for frames of the AV file, as the set of data inputs, in order to reduce latency at transcode time when the system can execute a transcode-time script to add facial graphics (e.g., filters) to the AV file based on the extracted pixel locations of facial features.

In another example, the system can execute an ingest-time script to extract audio amplitude data from the AV file prior to transcode-time and store the extracted audio amplitude data in the metadata store. The system can, subsequently, execute a transcode-time script to normalize the volume of the AV file based on the extracted audio amplitude data stored in metadata store. Thus, the system can extract data characterizing the full length of the AV file at ingest time while only executing the transcode-time script on requested segments of the AV file.

In yet another example, the system can execute an ingest-time script on a livestream in order to characterize the content of the livestream and store these metrics in the metadata store associated with the livestream. The system can then enable access to these metrics for further analysis.

5.6 Periodic or Conditional Metadata Scripts

Figure 4:
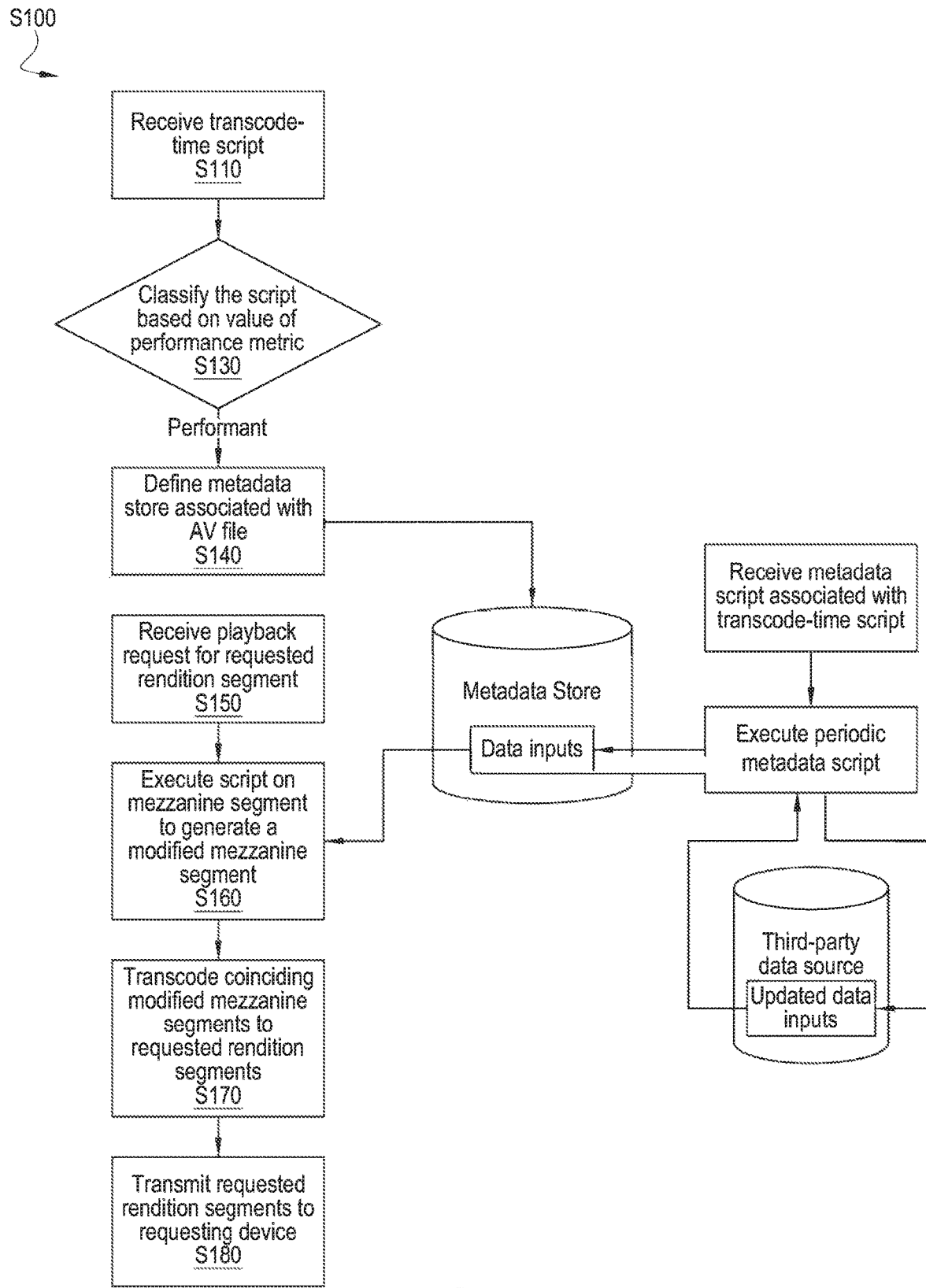
FIG. 4 is a flowchart representation of one variation of the method.

Upon completion of the above-described ingest process, the system can, as shown in FIG. 4, execute periodic metadata scripts or conditional metadata scripts in order to update the metadata store associated with an AV file with real-time data in response to a periodic timer or in response to detecting particular conditions. More specifically, the system can: receive a metadata script associated with the AV file and the transcode-time script and configured to update the set of data inputs based on a third-party data source; and after ingest time of the AV file, periodically, execute the metadata script to retrieve new values for the set of data inputs from the third-party data source and updating the set of data inputs in the metadata store to generate an updated set of data inputs based on the new values for the set of data inputs. Thus, the system can execute a metadata script to push updated values of the set of data inputs for use by the system in execution of the associated transcode-time script.

In one implementation, the system can execute a metadata script to periodically push (i.e. according to a predetermined time interval) new values of a set of data inputs from a third-party source to a metadata store. For example, the system can periodically (e.g., every minute, every hour, every 24 hours) push a set of updated data inputs representing the current weather to the metadata store associated with the AV file via a metadata script associated with an AV file depicting a weather forecast. In this example, the system can then execute a transcode-time script that generates updated weather graphics within the AV file based on the current set of data inputs representing weather data stored in the metadata store.

In another implementation, the system can execute a metadata script to push new values of a set of data inputs from a third-party source to a metadata store based on a set of trigger conditions. For example, the system can execute a metadata script that pushes new values of a game score to the metadata store in response to a score occurring in a sports game (or other game). The system, upon executing the transcode-time script, can then update a graphic representing the live score of the game in the AV file and serve the updated AV file to a user device. Thus, the system can execute metadata scripts that push data inputs for the AV file to the metadata store in response to real-time events.

5.7 Livestream Ingest

The system can ingest an AV livestream in a similar manner to an AV file. The system can: normalize an incoming livestream; segment the livestream according to keyframes identified in the livestream; and store mezzanine segments of the livestream in a mezzanine cache for the livestream. The system can also associate one or more transcode-time scripts with the livestream for execution upon just-in-time transcoding of the livestream mezzanine segments into streamed rendition segments. The above-described process is further described in in U.S. patent application Ser. No. 16/458,630.

5.8 Playback IDs and URLs

Generally, the system can assign a URL to a combination of scripts (transcode-time scripts, ingest time scripts, and/or metadata scripts) and an AV file. More specifically, the system can assign a universally unique identifier (hereinafter a "playback ID") to each unique pair of an AV file (or a livestream) and an associated script; and generate a URL for the pair of the AV file and the associated script based on the playback ID. The system can then provide a stream of the AV file, modified by the script, based on requests received at the specified URL. Additionally, the system can maintain a separate mezzanine cache and/or rendition cache for each URL assigned by the system.

In one implementation, the system can generate unique URLs and corresponding distinct rendition caches for various combinations of transcode-time scripts, ingest-time scripts, and/or metadata scripts. For example, the system can generate a first playback ID and corresponding first URL representing the combination of a first AV file and a first transcode-time script. Upon receiving a second transcode-time script in replacement of the first transcode-time script, the system can generate a second playback ID and a corresponding second URL representing the combination of the first AV file and the second transcode-time script. Upon receiving a first ingest-time script to be executed in addition to the transcode time script, the system can generate a third playback ID and a corresponding third URL representing the combination of the first AV file, the second transcode-time script, and the first ingest-time script. Thus, the system can generate a new playback ID to represent any new combination of scripts and the AV file.

6. Playback Requests

Generally, upon ingesting a transcode-time script and an AV file according to the above-described Blocks of the method S100, the system can publish a stream of the AV file to AV player instances executing on computational devices (e.g., smartphones, tablet computers, laptop computers, desktop computers) by generating a manifest file advertising a set of available renditions of the AV file to the AV player instances. The system can then receive a request from an AV player instance (e.g., via a CDN) for a particular rendition of the AV file in order to render the AV file at the AV player instance. More specifically, the system can receive a playback request for an AV file from a computational device, the playback request specifying: a playback segment of the AV file; a specific rendition of the AV file; and/or the associated transcode-time script of the AV file, via a unique URL associated with the combination of the AV file and the associated transcode-time script in Block S150. Thus, the system can, in response to receiving the playback, request initiate execution of the transcode-time script and transcoding of the AV file modified by the script.

6.1 Rendition Cache Generation

Generally, the system can define a set of rendition caches associated with a playback ID (and therefore a combination of scripts and the AV file), wherein each rendition cache in the set of rendition caches corresponds to a particular bitrate resolution pair for which the AV file is available for streaming. However, if a new transcode-time script is ingested in association with an existing AV file or a data input to the transcode-time script is modified such that, upon execution of the transcode-time script, the AV file changes relative to a previous version of the AV file (e.g., that was modified according to a prior transcode-time script), the system can generate a new rendition cache in which to store newly modified and transcoded segments of the AV file.

Thus, upon modifying and transcoding mezzanine segments of the AV file corresponding to requested playback segments of the AV file into rendition segments in the requested rendition, the system can store the resulting modified rendition segments into a rendition cache corresponding to the combination of the transcode-time script and the AV file. The system can define a rendition cache for each unique combination of script and AV file. Therefore, if the system ingests multiple scripts in association with a single AV file, then the system can define a rendition cache for each script.

In implementations wherein the system assigns URLs including URL fields, the system can define a new rendition cache corresponding to each unique string received as a URL parameter even if the transcode-time script and AV file corresponding to the URL have remained the same. Thus, the system can define separate rendition caches for each unique version of the AV file produced by a single script.

6.1.1 URL Parameters

Figure 5:
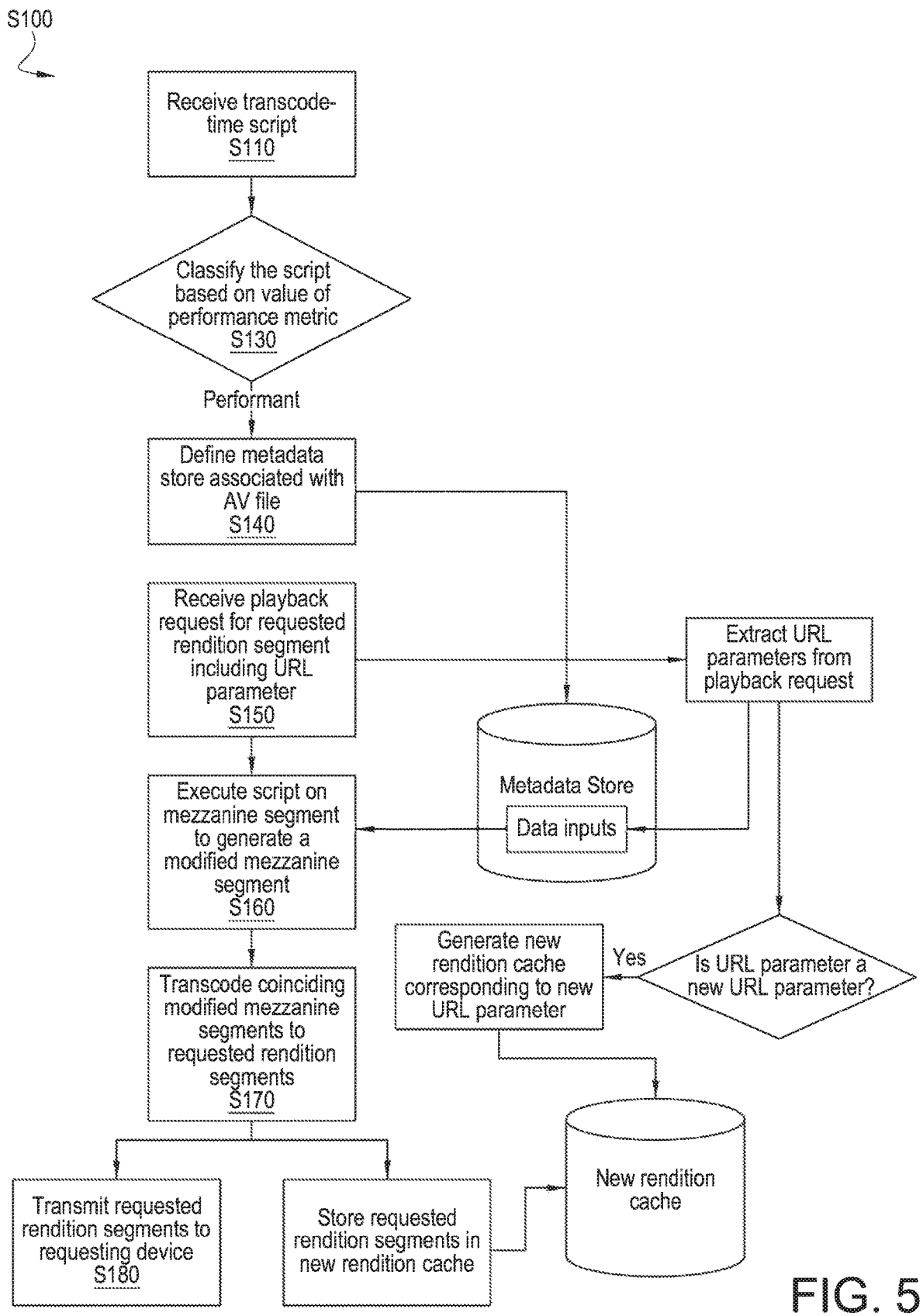
FIG. 5 is a flowchart representation of one variation of the method.

In one implementation, as shown in FIG. 5, the system can generate URLs including URL parameter fields within which the computational device executing an AV player instance (e.g., via a browser application executing the AV player instance) can inject particular strings for utilization by the system in an associated transcode-time script. More specifically, the system can: extract a URL parameter value from the URL parameter field; and execute the transcode-time script on a frame of the AV file based on the set of data inputs and the URL parameter value to generate a modified frame of the AV file.

In one example, for a transcode-time script that generates a graphic displaying a name within the video (e.g., a happy birthday graphic in a happy birthday video, a watermark indicating the viewer of the video), the system can generate a URL with a field for specifying the name in the graphic. Upon receiving a string via the URL field, the system can generate a separate rendition cache if the string in the URL field is a new string or can access a previously existing rendition cache in response to receiving a request URL with the same string in the URL field. In another such example, the system can render a watermark representing a URL parameter value over frames of the first audio-video file to generate modified frames of the first audio-video file including the watermark. Thus, if a viewer attempts to redistribute the AV file, the original viewer responsible for this redistribution can be easily identified.

In yet another example, the system can generate a URL field within which the computational device executing the AV player instance can insert the current location of the computational device. The system can then, upon receiving a request at the URL including the URL field, execute a location-dependent transcode-time script based on the current location extracted from the URL field. Thus, the system can modify frames of the AV file with location-dependent graphics or other effects such as local weather, local news tickers, or any other graphic.

Additionally, the system can execute a URL signing protocol to prevent abuse of the URL fields to generate an unlimited number of rendition caches via repeated requests at URLs with different strings in a URL input field.

6.1.2 Saved State Cache

Because the system can execute metadata scripts that update data inputs for the transcode-time script in real-time, the system can generate different versions (e.g., based on a different set of data inputs to the transcode-time script) in response to receiving playback requests for the AV file at different times. In one example, the system can execute a transcode-time script that renders the current time within each frame of the AV file. In this example, if the system receives a first playback request for a first segment (or rendition) of the AV file at a first time, the system executes the transcode-time script to render the first time into each frame of the first segment (or rendition) of the AV file. If the system later receives a second playback request for a second segment of the AV file at a second time, the system executes the transcode-time script to render the second time into each frame of the second segment. The system can then store each of these segments in the rendition cache and, in response to receiving a playback request for either of the first or second segment, the system can serve these segments directly from the rendition cache (instead of modifying and transcoding these segments again)

Thus, in this example, the system renders a time into the AV file that is not representative of the time at which a viewer is viewing the AV file or representative of the time at which the video was first streamed or uploaded. Instead, the system renders a time that corresponds to the time at which each segment (or rendition) was first transcoded.

This effect may be counterintuitive and/or confusing to viewers of the AV file and, therefore, the system can mitigate these effects by saving the state of the metadata cache at a time when the AV file is first requested. Thus, the system can modify the AV file according to a static set of data inputs from the metadata file after a first viewing of the AV file, thereby ensuring that each subsequent view of the AV file includes temporally consistent graphics and/or audio effects across the entire AV file. More specifically, the system can: in response to receiving a first playback request for the AV file, save the state of the metadata store corresponding to the AV file and the transcode-time script; and, in response to receiving a second playback request of the AV file, execute the transcode-time script based on the saved state of the metadata store.

Figure 6:
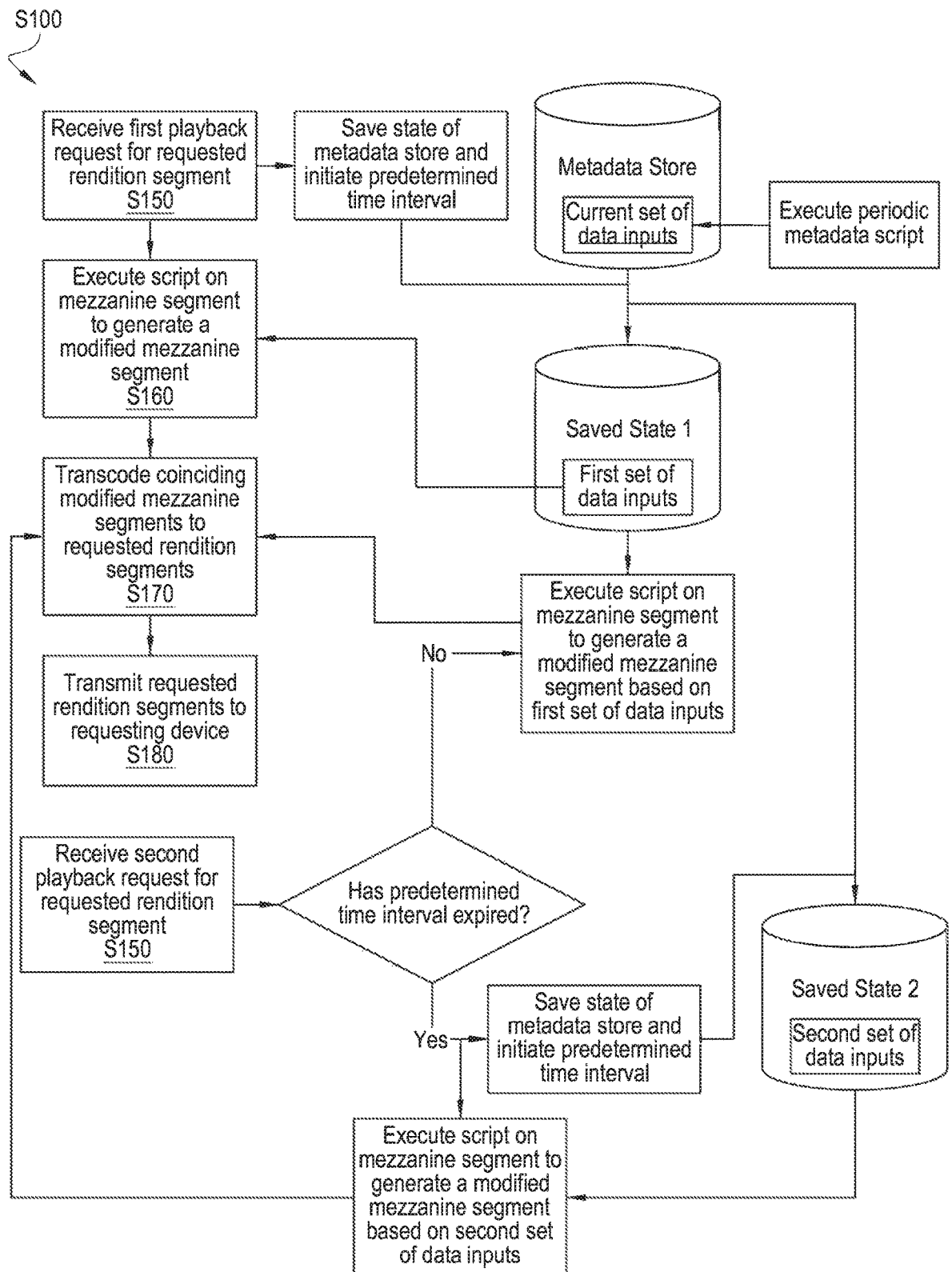
FIG. 6 is a flowchart representation of one variation of the method.

In one implementation, as shown in FIG. 6, the system can save the state of the metadata store for a predetermined time interval during which time the set of data inputs to the transcode-time script remain static. In response to expiration of the predetermined time interval, the system can define a new rendition cache and enable a metadata script to update the metadata store with a new set of data inputs. Upon receiving, another playback request, the system can again save the state of the metadata store for the predetermined time interval. In this manner, the system can ensure version consistency within each time interval, while allowing variation in the AV file over time in accordance with changes to the data inputs of the transcode-time script within the metadata store.

Figure 7:
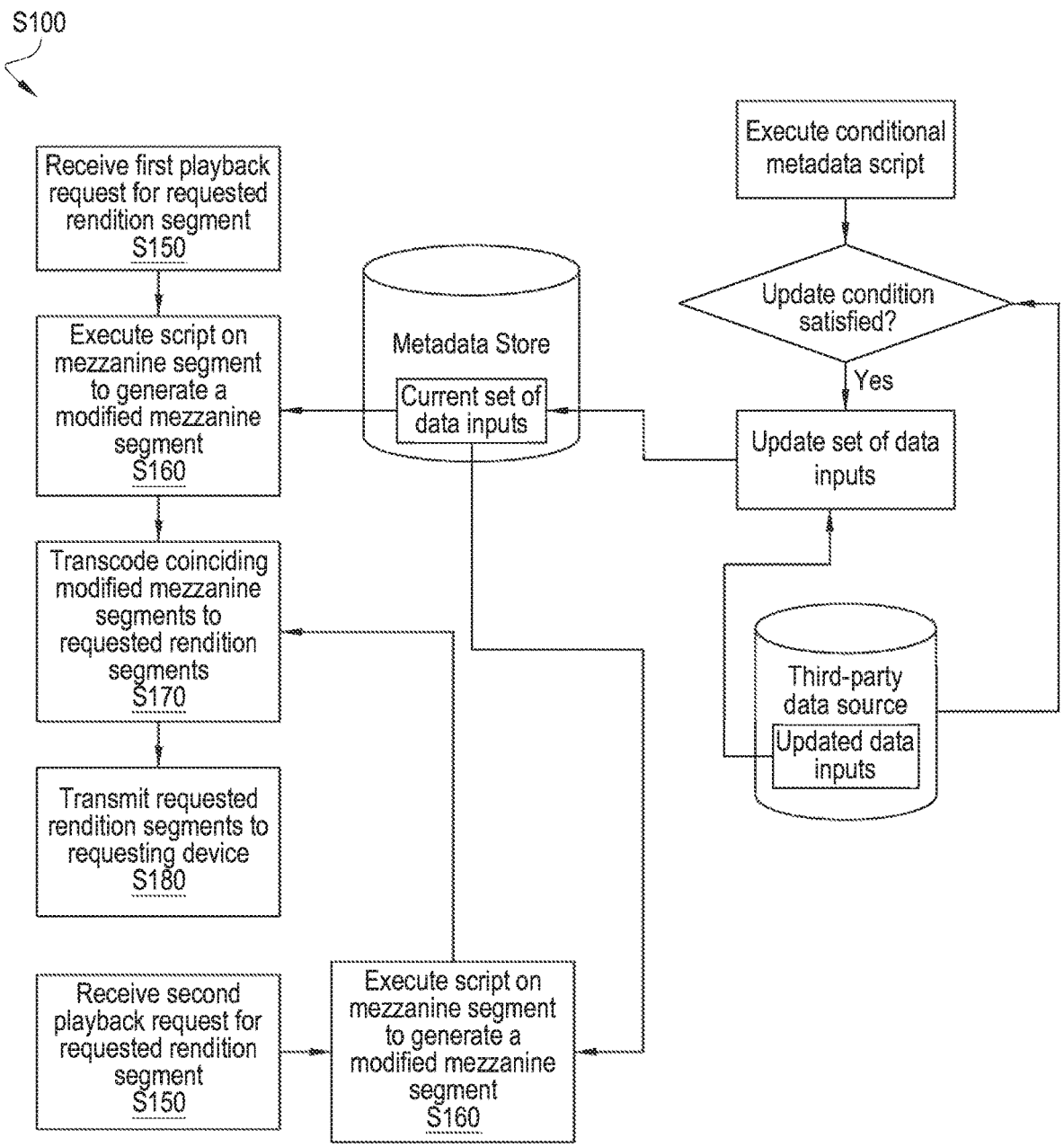
FIG. 7 is a flowchart representation of one variation of the method.

In another implementation, as shown in FIG. 7, the system can save the state of the metadata store until a set of conditions are satisfied. For example, the system can maintain the state of the metadata store until a goal is scored in a live sports game. In response, the system can then enable a metadata script to update the metadata store to reflect this change in the score. Thus, via the above-described hybrid approach, the system can maintain real-time responsiveness to changes in input data without creating inconsistencies between prior versions of the AV file and current versions of the AV file. One disadvantage of this approach is the increased computational cost and storage cost incurred by the system when defining a new rendition cache for each version of the AV file and when re-executing and re-transcoding the AV file for each new version of the AV file. However, the system, upon updating the state of the metadata store, can delete prior versions of the AV file stored in rendition caches in order to reduce storage costs.

7. Just-In-Time AV Editing

After storing the AV file in a mezzanine cache, defining a rendition cache, defining a metadata store associated with AV file, and storing the transcode-time script for later execution, the system can, in response to receiving a playback request for the AV file, just-in-time modify the AV file according to the transcode-time script and just-in-time transcode the modified AV file before transmitting the AV file to a requesting computational device. More specifically, the system can: access a set of data inputs from the metadata store in Block S142; execute the transcode-time script on a frame of the AV file based on the set of data inputs to generate a modified frame of the AV file in Block S160; transcode the modified frame of the AV file into a first rendition to generate an output frame of the AV file in Block S170; and transmit the output frame of the AV file to the requesting computational device for playback at the requesting computational device in Block S180. Thus, by only executing the transcode-time script and, therefore, modifying frames of the AV file in response to a playback request, the system can reduce computational costs at ingest-time by only executing the transcode-time script on requested segments of the AV file. As a result, if particular segments of the AV file are never requested, the system conserves the computational costs of running the transcode-time script on these particular segments.

In order to execute the transcode-time script and transcode coincident mezzanine segments into rendition segments, the system can identify a set of mezzanine segments that correspond to the requested playback segment. More specifically, once the system receives the request for a playback segment, the system identifies a consecutive subset of mezzanine segments in the set of mezzanine segments of the requested AV file with at least one of an initial keyframe timestamp and a terminal keyframe timestamp of each mezzanine segment in the subset of AV segments occurring within a playback interval of the requested playback segment. Generally, the system identifies the mezzanine segments that coincide with or temporally overlap (based on timestamps) with a requested playback segment.

In one implementation, the system compares the timestamps of the initial keyframe timestamp and the terminal keyframe timestamp of each mezzanine segment to the playback interval of the playback segment to identify mezzanine segments that overlap with the playback segment. If either the start or the end time of a mezzanine segment occurs between the start and end times of the playback segment, then the playback segment includes at least a portion of the mezzanine segment. In implementations in which the mezzanine segments are stored without priming or trailing audio buffers, the system can identify segments with starting times within a trailing buffer's duration of the end of the playback interval and/or segments with end times within a priming buffer's duration of the start time of the playback interval. In this implementation, the system ensures that a priming buffer and/or a trailing buffer are included for the playback segment.

Once the system identifies a set of consecutive mezzanine segments corresponding to a playback segment, the system can identify; whether the mezzanine segments have already been modified according to the associated transcode-time script and transcoded into the requested rendition; whether the mezzanine segments are currently being modified according to the associated transcode-time script and transcoded into the requested rendition; or whether the mezzanine segments have already been modified and transcoded into the requested rendition and are present in the rendition cache.

If the system identifies that the mezzanine segments corresponding to the playback segment have already been modified according to an associated script and transcoded into the requested rendition, then the system can stream the resulting rendition segments to the requesting computational device directly from the rendition cache. Otherwise, the system can initiate the just-in-time editing and transcoding process described below.

However, the system can identify mezzanine segments coincident with the requested playback segment in any other way.

7.1 Script Execution

Generally, the system can, in response to classifying a transcode-time script as performant and in response to receiving a playback request, access the set of data inputs from the metadata store in Block S142. More specifically, the system can execute a transcode-time script that imports a set of data inputs from the metadata store associated with the AV file via APIs defined by the system. Thus, the system can enable data transfer between the local memory of a first computational device (within the system) executing the transcode-time script and a second computational device that stores the metadata associated with the transcode-time script.

In response to receiving a request to stream the AV file modified by the transcode-time script at the URL associated with AV file and/or classifying the transcode-time script as a performant script, the system can, for each frame of a set of mezzanine segments of the AV file coinciding with the playback segment of the AV file, execute the transcode-time script associated with the AV file to generate a modified frame, which together form a modified segment in Block S160. Thus, the system can execute graphical or audio modification of each video or audio frame of the requested segments of the AV file. Because each mezzanine segment of the AV file includes a keyframe for the subsequent frames within the mezzanine segment, the system can access the keyframe of each mezzanine segment in order to decode subsequent frames within the mezzanine segment prior to executing the transcode-time script on the decoded subsequent frames. Additionally, the system can concurrently decode later frames within the segment, while executing the transcode-time script on previously decoded frames, thereby reducing the latency of the task. Thus, the system can apply modifications to the AV file according to the transcode-time script on a frame-wise basis in order to modify the AV file according to the transcode-time script associated with the AV file.

Figure 8A:
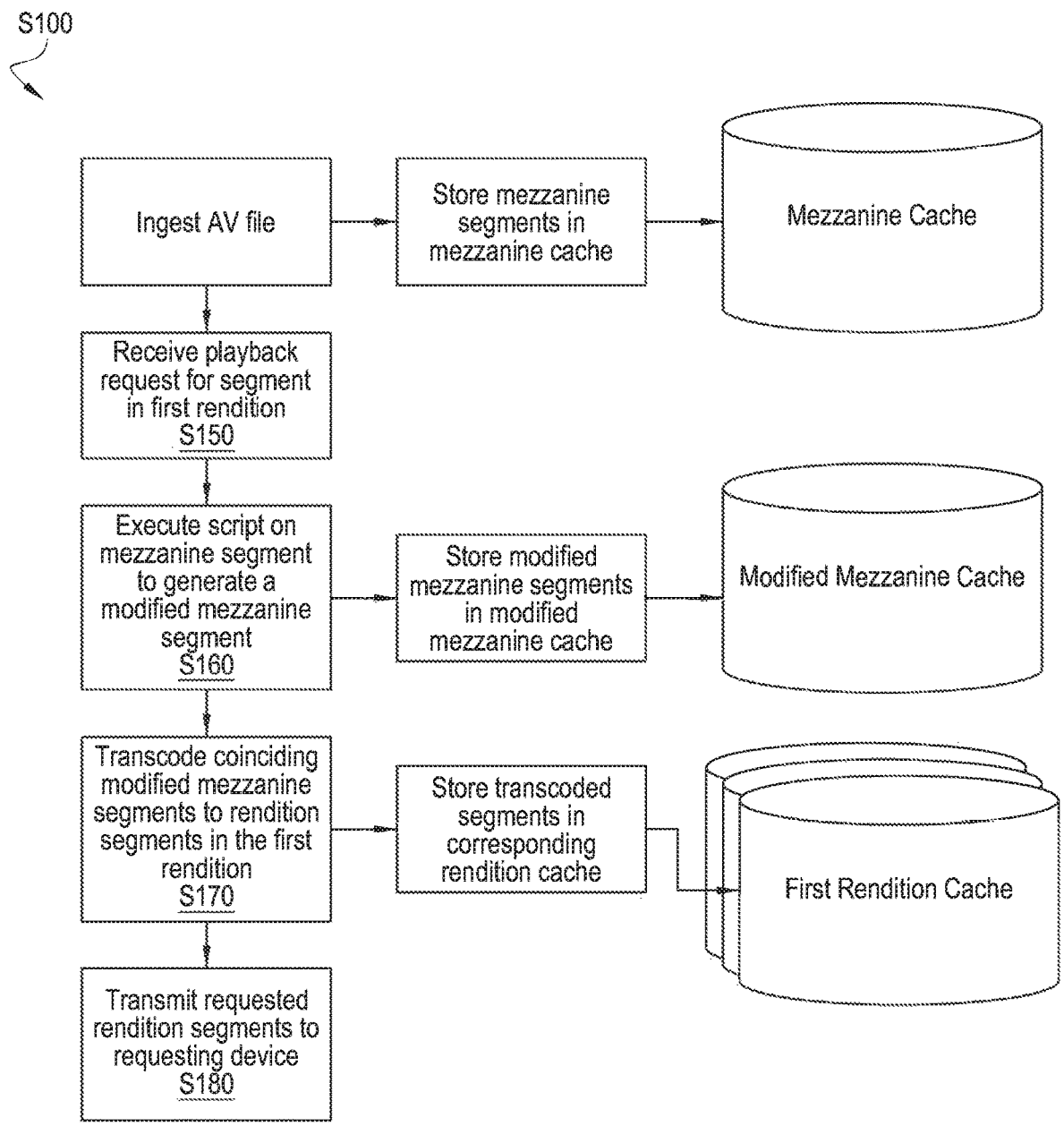
FIGS. 8A and 8B are flowchart representations of the method.

As shown in FIG. 8A, in one implementation, the system executes the transcode-time script on each frame (or on select frames according to the transcode-time script) of each mezzanine segment corresponding to the requested playback segment to generate a set of modified frames prior to just-in-time transcoding the output frames into the requested rendition. Therefore, by executing the transcode-time script prior to transcoding the mezzanine segment into a rendition segment, the system can incorporate any modifications to the modified mezzanine segments made by the transcode-time script into a rendition encoding of the AV file.

In this implementation, the system can store an intermediate (modified) version of the AV file within the mezzanine cache in order to prevent the system from having to re-execute the transcode-time script on the same set of frames in response to each request for these frames of the AV file. Thus, the system can: in response to classifying the transcode-time script as performant and in response to receiving a first playback request, store a first modified frame of the AV file; and receive a second playback request for the AV file from a second computational device, the second playback request specifying a second rendition of the AV file. Then the system can, in response to classifying the first script as performant and in response to receiving the second playback request: transcode the first modified frame of the AV file into the second rendition to generate a second output frame of the AV file; and transmit the second output frame to the second computational device for playback at the second computational device.

Figure 8B:
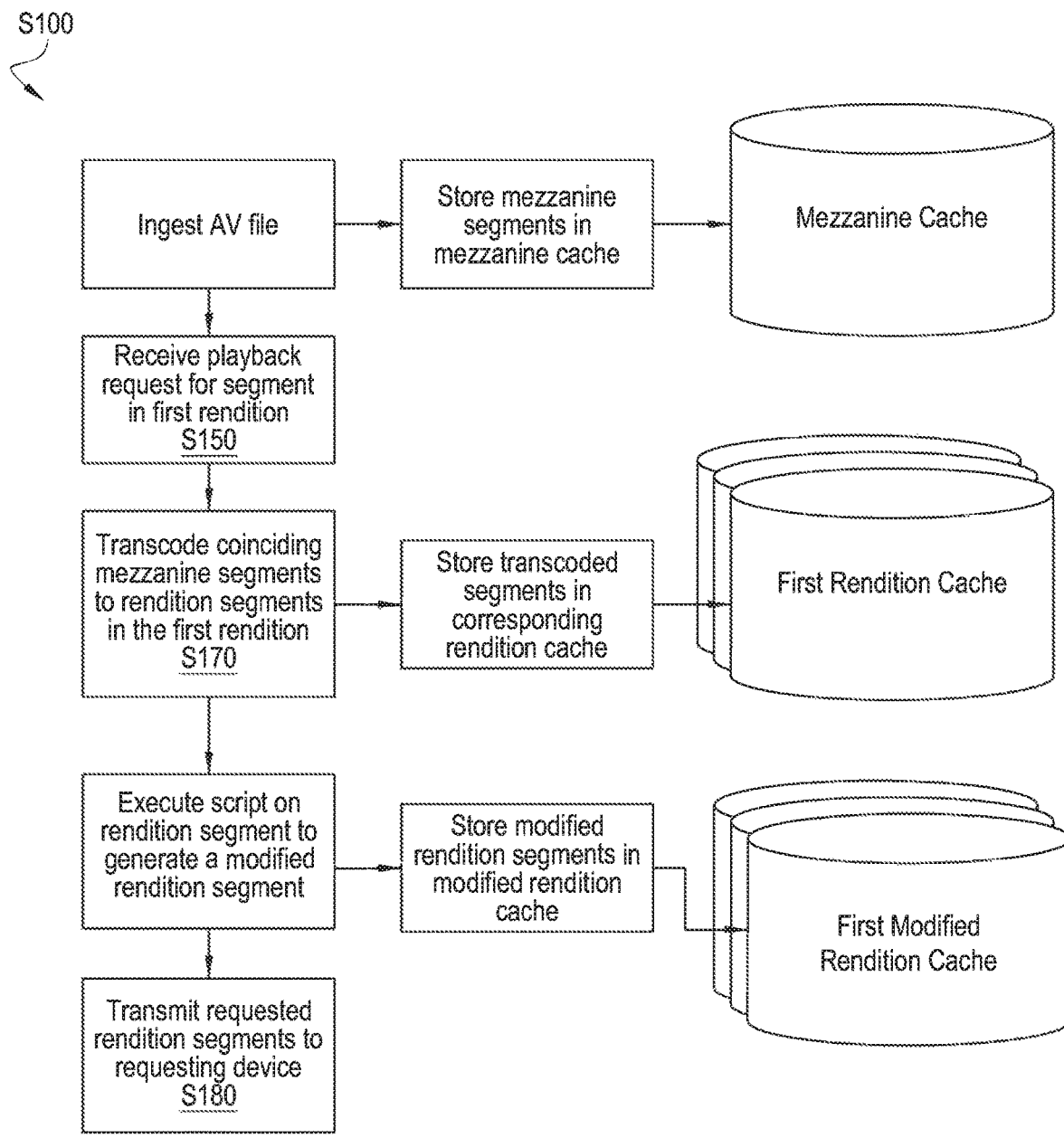

As shown in FIG. 8B, in another implementation, the system can first transcode the set of mezzanine segments into the requested rendition segments and then execute the transcode-time script on frames of the rendition segments before reencoding the modified rendition segments. In this implementation, the system can potentially save processing time by executing the transcode-time script on the lower resolution and/or lower bitrate rendition segments as opposed to the higher resolution and/or high bitrate mezzanine segments.

Therefore, upon executing the transcode-time script on either a consecutive set of mezzanine segments corresponding to the playback segment or a consecutive set of rendition segments, the system generates modified output frames that comprise a set of consecutive modified segments. The system can then transcode or reencode these modified segments in order to prepare the modified segments for streaming.

7.2 Just-in-Time Transcoding

Generally, the system can transcode the output frames generated by the transcode-time script into the first rendition. Alternatively, the system can reencode modified rendition segments in preparation for streaming the modified rendition segments. More specifically, the system can transcode a modified frame of the AV file into the requested rendition to generate an output frame of the AV file in Block S170.

The system can execute the just-in-time transcoding process described in U.S. patent application Ser. No. 16/458, 630. Generally, in the just-in-time transcoding process, the system can transcode mezzanine segments coinciding with a requested playback segment into rendition segments of the requested rendition in real-time upon receiving a request from a CDN or AV player instance. Upon receiving a request for a playback segment from a CDN or AV player instance, the system can identify whether the corresponding mezzanine segments have not been scheduled for transcoding, are currently being transcoded by the system, or have already been transcoded and the requested rendition segments are in the rendition cache. Based on this identification, the system can either establish a peer-to-peer stream between the hardware that is transcoding the mezzanine segments and the requesting device or stream the transcoded rendition segments directly from the rendition cache.

8. Cost Estimation

In one implementation, the system upon receiving a transcode-time script can estimate the storage and computational costs of the transcode-time script and/or associated metadata scripts and ingest-time scripts. More specifically, the system can: estimate a space of valid URL parameter values based on the transcode-time script; estimate an audience of the AV file; and calculate a computational cost and/or a storage cost of streaming the AV file based on the space of valid URL parameter values and the audience of the AV file. Thus, the system can identify scripts that, when executed by the system, may tax available computational and storage resources of the system and flag these scripts accordingly. Alternatively, the system can set a monetary price for executing a set of scripts associated with an AV file based on the estimated computational costs and/or storage costs of executing the set of scripts.

9. Runaway Script Detection

In one implementation, the system can detect transcode-time scripts that, when executed by the system, execute slower than real-time (i.e., slower than the playback speed of the video), thereby introducing playback delay at the AV player instance streaming the AV file. More specifically, the system can, in response to detecting execution of the transcode-time script on the AV file and transcoding of the AV file into the requested rendition is proceeding at slower than real-time, halt execution of the transcode-time script. Thus, in applications in which the system has failed to identify a non-performant script via the aforementioned Blocks of the method S100, the system can identify slower than real-time performance of the transcode-time script and revert to just-in-time transcoding and streaming the AV file without executing the transcode-time script. The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with the apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
accessing a set of test files based on a first audio-video file and a video classification model;
for a first script associated with the first audio-video file, defining the first script as performant based on execution of the first script on the set of test files;
storing a first set of mezzanine segments corresponding to a first playback segment in a mezzanine cache;
receiving a first playback request for the first playback segment in the first audio-video file from a first computational device, the first playback request specifying a first rendition of the first playback segment;
executing the first script on the first set of mezzanine segments to generate a first set of modified mezzanine segments;
storing the first set of modified mezzanine segments in a first modified mezzanine cache;
transcoding the first set of modified mezzanine segments to generate a first set of rendition segments in the first rendition;
storing the first set of rendition segments in a first rendition cache; and
transmitting the first set of rendition segments to the first computational device for playback at the first computational device.

2. The method of claim 1, further comprising:
receiving a second playback request for the first playback segment in the first audio-video file from a second computational device, the second playback request specifying a second rendition of the first playback segment;
executing the first script on a second set of mezzanine segments corresponding to the first playback segment to generate a second set of modified mezzanine segments;
transcoding the second set of modified mezzanine segments to generate a second set of rendition segments in the second rendition;
storing the second set of rendition segments in a second rendition cache; and
transmitting the second set of rendition segments to the second computational device for playback at the second computational device.

3. The method of claim 2:
wherein storing the first set of rendition segments in the first rendition cache comprises storing the first set of rendition segments in the first rendition cache based on a first bitrate-resolution pair of the audio-video file; and
wherein storing the second set of rendition segments in the second rendition cache comprises storing the second set of rendition segments in the second rendition cache based on a second bitrate-resolution pair of the audio-video file.

4. The method of claim 1, further comprising:
executing a video classification model to classify characteristics of the first audio-video file to generate a classification vector indicative of the first audio-video file;
calculating a difference vector between the classification vector indicative of the first audio-video file and a reference classification vector indicative of characteristics of each test file in the set of test files;
identifying a threshold difference between the classification vector indicative of the first audio-video file and the reference classification vector indicative of characteristics of each test file in the set of test files; and
selecting a second set of test files based on the threshold difference, the second set of test files for defining the first script as performant.

5. The method of claim 4, further comprising:
executing the first script on the second set of test files to generate a set of runtimes, each of the runtimes corresponding to a test file in the second set of test files; and
classifying the first script as performant based on a first threshold runtime exceeding each of the set of runtimes.

6. The method of claim 1:
further comprising, defining a metadata store associated with the first script and the first audio-video file;

further comprising, in response to classifying the first script as performant and in response to receiving the first playback request, accessing a set of data inputs from the metadata store; and wherein executing the first script on the first set of mezzanine segments to generate a first set of modified mezzanine segments comprises executing the first script on the first set of mezzanine segments based on the set of data inputs to generate the first set of modified mezzanine segments.

7. The method of claim 1, further comprising in response to receiving the first playback request for the first playback segment in the first audio-video file from the first computational device, identifying the first set of mezzanine segments based on a first keyframe timestamp and a second keyframe timestamp preceding the first keyframe timestamp coinciding with the first playback segment.

8. The method of claim 7, wherein identifying the first set of mezzanine segments based on a first keyframe timestamp and a second keyframe timestamp preceding the first keyframe timestamp coinciding with the first playback segment comprises comparing the first keyframe timestamp and the second keyframe timestamp to a playback interval of the first playback segment to identify an overlap between the first set of mezzanine segments and the first playback segment.

9. The method of claim 1:
wherein receiving the first playback request for the first playback segment in the first audio-video file from the first computational device comprises identifying the first set of rendition segments in the first rendition cache; and
further comprising, in response to identifying the first set of rendition segments in the first rendition cache, streaming the first set of rendition segments to the first computational device for playback at the first computational device from the first rendition cache.

10. A method comprising:
accessing a set of test files based on a first audio-video file and a video classification model;
for a first script associated with the first audio-video file, defining the first script as performant based on execution of the first script on the set of test files;
storing a first set of mezzanine segments corresponding to a first playback segment in a mezzanine cache;
receiving a first playback request for the first playback segment in the first audio-video file from a first computational device, the first playback request specifying a first rendition of the first playback segment;
executing the first script on a first set of rendition segments to generate a first set of modified rendition segments;
storing the first set of modified rendition segments in a first modified rendition cache;
transmitting the first set of modified rendition segments to the first computational device for playback at the first computational device.

11. The method of claim 10:
further comprising, receiving a second playback request for the first playback segment in the first audio-video file from a second computational device, the second playback request specifying a second rendition of the first playback segment;
further comprising, transcoding the first set of mezzanine segments into a second set of rendition segments based on the second rendition;

wherein executing the first script on the second set of rendition segments to generate a second set of modified rendition segments comprises storing the second set of modified rendition segments in a second modified rendition cache corresponding to the second rendition; and
further comprising, transmitting the second set of modified rendition segments to the second computational device for playback at the second computational device.

12. The method of claim 10:
wherein receiving the first playback request for the first playback segment in the first audio-video file from the first computational device comprises identifying the first set of rendition segments in a first rendition cache; and
further comprising, in response to identifying the first set of rendition segments in the first rendition cache, streaming the first set of modified rendition segments to the first computational device for playback at the first computational device from the first rendition cache.

13. The method of claim 10, further comprising, in response to receiving the first playback request for the first playback segment in the first audio-video file from the first computational device, identifying the first set of mezzanine segments based on a first keyframe timestamp and a second keyframe timestamp preceding the first keyframe timestamp coinciding with the first playback segment.

14. The method of claim 13, wherein identifying the first set of mezzanine segments based on a first keyframe timestamp and a second keyframe timestamp preceding the first keyframe timestamp coinciding with the first playback segment comprises comparing the first keyframe timestamp and the second keyframe timestamp to a playback interval of the first playback segment to identify an overlap between the first set of mezzanine segments and the first playback segment.

15. A method comprising:
receiving a first script associated with a first audio-video file;
executing the first script on a set of test files to compute a first performance metric;
classifying the first script as performant based on the performance metric;
storing a first set of mezzanine segments corresponding to a first playback segment in a first mezzanine cache;
assigning a first identifier to a first combination of the first script and the first audio-video file;
generating a first resource locator for the first combination of the first script and the first audio-video file based on the first identifier, the first resource locator comprising a first resource locator parameter field;
receiving a first playback request, indicating the first resource locator, for the first playback segment in the first audio-video file from a first computational device, the first playback request specifying a first rendition of the first playback segment;
executing the first script on the first set of mezzanine segments to generate a first set of modified mezzanine segments;
transcoding the first set of modified mezzanine segments to generate a first set of rendition segments in the first rendition;
in response to receiving the first playback request, transmitting the first set of rendition segments to the first computational device for playback at the first computational device;

receiving a second script associated with the first audio-video file;

assigning a second identifier to a second combination of the second script and the first audio-video file; and generating a second resource locator for the second combination of the second script and the first audio-video file based on the second identifier.

16. The method of claim 15, further comprising:

identifying a resource locator parameter value in the first resource locator parameter field;

extracting the resource locator parameter value from the first resource locator parameter field; and wherein executing the first script on the first set of mezzanine segments to generate the first set of modified mezzanine segments comprises executing the first script on the first set of mezzanine segments based on a set of data inputs of a metadata store and the resource locator parameter field to generate the first set of modified mezzanine segments.

17. The method of claim 15, further comprising in response to receiving the first playback request for the first playback segment in the first audio-video file from the first computational device, identifying the first set of mezzanine segments based on a first keyframe timestamp and a second keyframe timestamp preceding the first keyframe timestamp coinciding with the first playback segment.

18. The method of claim 15, wherein identifying the first set of mezzanine segments based on a first keyframe timestamp and a second keyframe timestamp preceding the first keyframe timestamp coinciding with the first playback segment comprises comparing the first keyframe timestamp and the second keyframe timestamp to a playback interval of the first playback segment to identify an overlap between the first set of mezzanine segments and the first playback segment.

19. The method of claim 15, further comprising:

receiving a third script associated with a first live audio-video stream;

segmenting the first live audio-video stream based on a set of key frames in the first live audio-video stream;

storing a third set of mezzanine segments corresponding to the first live audio-video stream in a second mezzanine cache; and transcoding the third set of mezzanine segments to generate a second set of rendition segments corresponding to the third set of mezzanine segments in a second rendition.

* * * * *